March 25, 1958 W. A. SWANEY 2,828,346
ANTHRACENE RECOVERY PROCESS
Filed May 19, 1954 3 Sheets-Sheet 1
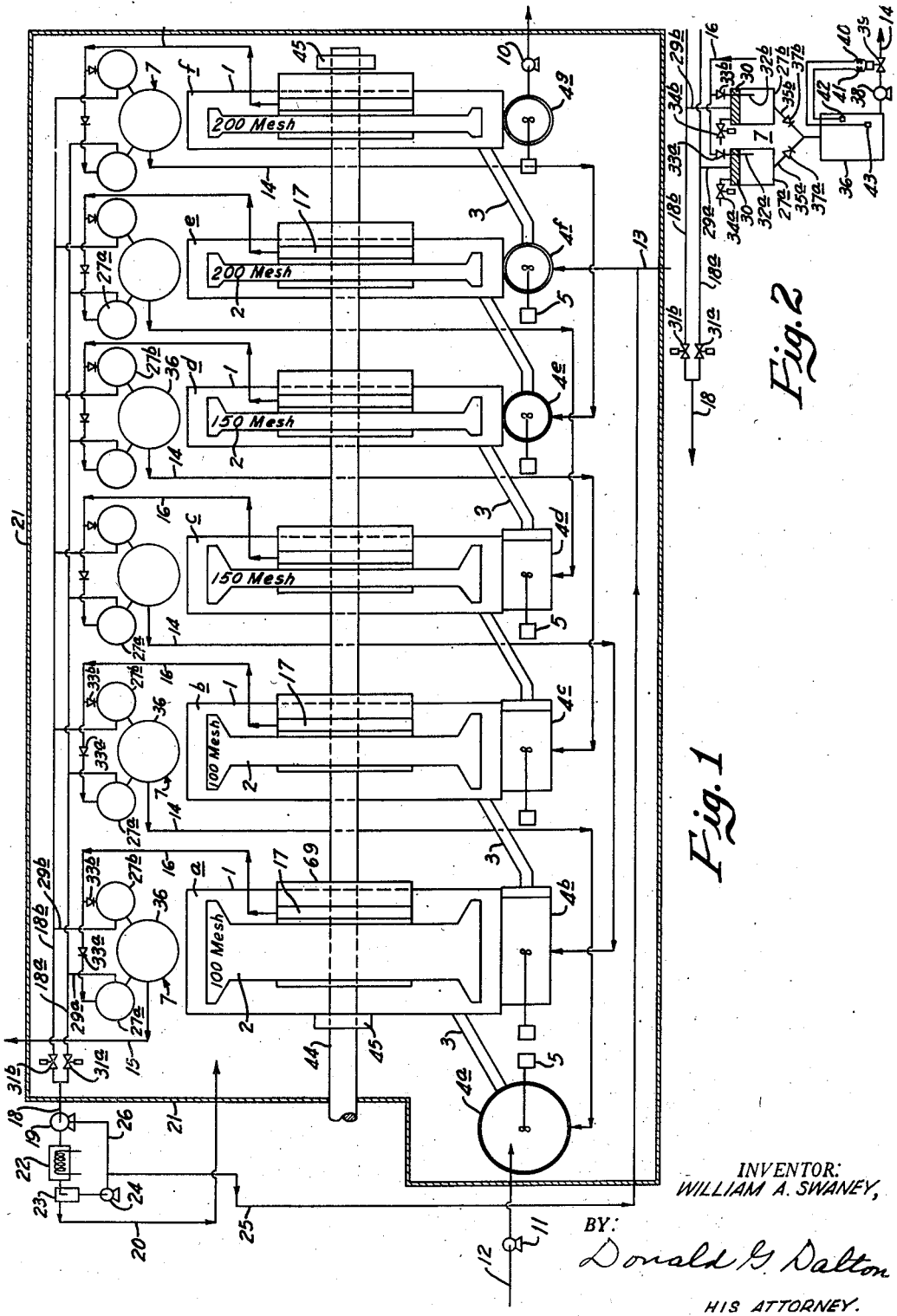
INVENTOR:
WILLIAM A. SWANEY,
BY: Donald G. Dalton
HIS ATTORNEY.

March 25, 1958  W. A. SWANEY  2,828,346
ANTHRACENE RECOVERY PROCESS
Filed May 19, 1954  3 Sheets-Sheet 2

INVENTOR:
WILLIAM A. SWANEY,
BY:
Donald G. Dalton
HIS ATTORNEY.

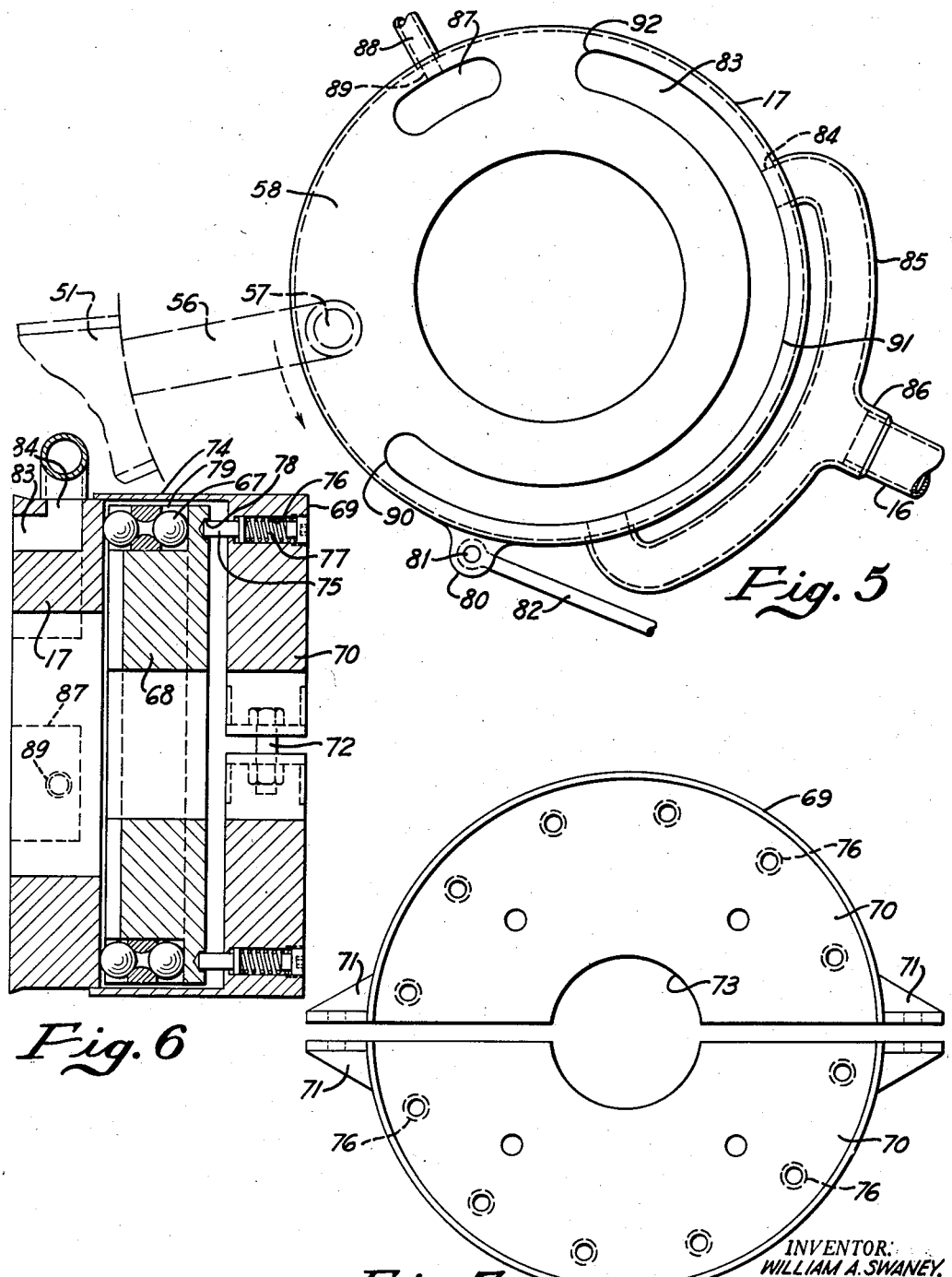

2,828,346
ANTHRACENE RECOVERY PROCESS

William A. Swaney, Pittsburgh, Pa., assignor to United States Steel Corporation, a corporation of New Jersey Application May 19, 1954, Serial No. 430,845

2 Claims. (Cl. 260—675)

This invention relates, as indicated, to a process for recovering anthracene, and, more particularly, to a process for recovering anthracene from a mixture therewith of other aromatic hydrocarbon compositions of a crystalline structure.

The process of this invention is particularly adapted to the recovery of anthracene from a creosote cake or slurry derived from the creosote oil run-off produced by the fractional distillation of coke-oven tar. In the fractional distillation of coke-oven tar, the creosote oil run-off carries with it the heavier aromatic hydrocarbons anthracene, phenanthrene, carbazole, and other unclassified materials which crystallize when the run-off is cooled to about 75° F. from the run-off temperature of about 220° F. and which are recovered in the form of a cake by a filtering operation. The recovered cake is saturated with heavy creosote oil and is readily converted into a heavy slurry by mechanical agitation. The recovery of anthracene from this cake or slurry of course requires the removal of the creosote oil as well as the other hydrocarbon crystals mixed therewith, and this presents a difficult problem since the materials in the mixture have similar boiling points and densities and these material characteristics render conventional recovery procedures impractical.

For the purpose of recovering anthracene from a creosote cake or the like, a recrystallization procedure involving successive heating and cooling steps has been proposed. To render such recrystallization procedures practical, the hydrocarbon crystal content of the creosote cake must be concentrated as by treatment in a centrifuge to remove as much of the creosote oil as possible. Thereafter a solution of the residue is formed by mixing and heating it with a solvent, the heated solution being then cooled to recrystallize the anthracene which is recovered by filtering, and these steps must be repeated at least once in order to obtain a product containing anthracene in the nature of 90–95% purity. Since the heating and cooling steps of this recovery procedure must be carefully controlled, the apparatus required is so expensive as to be not practical and only limited production is obtained. In addition, excessive quantities of solvent are required by this recovery procedure.

One of the principal objects of this invention is to provide a process for the recovery of anthracene from a creosote oil-laden cake or slurry in which all of the operations are conducted at room temperature and which enables the use of considerably less solvent and a relatively less expensive recovery apparatus capable of much greater production as compared to the apparatus required by the proposed recovery procedure referred to above.

A further object of the invention is to provide a process for recovering anthracene from a mixture therewith of other crystal hydrocarbon compositions which involves forming a solution of the said other crystal hydrocarbon compositions in a solvent in which the anthracene is relatively insoluble at room temperatures, the anthracene being retained in the solution in its crystal form and being thereafter recovered by a filtering operation. In a manner to be described, the solvent for the said other crystal hydrocarbon compositions is selected from the group consisting of pyridine, alpha picoline, beta gamma picoline, and methyl-ethyl ketone, the preferred solvent being pyridine since it is more readily available in commercial quantities.

A still further object of the invention is to provide a process according to the object just referred to in which the solution of the selected solvent and the said other crystal hydrocarbon compositions is utilized as a solvent for removing the creosote oil and other lower boiling point hydrocarbons from the creosote cake in the initial stages of a continuous multi-stage recovery operation, the recovery operation being comprised of a plurality of filtering stages through which the anthracene and the selected solvent have a countercurrent flow in a manner to be described.

A still further object of the invention is to provide a process of the character just referred to in which the ratio by weight of the selected solvent to the creosote cake is reduced to a minimum which is both sufficient to remove substantially all of the hydrocarbon materials intermingled with the anthracene in the creosote cake and which is effective to provide a maximum recovery of the anthracene.

In accordance with the process of this invention, the creosote cake containing the anthracene to be recovered is intimately mixed with pyridine or one of the other selected solvents referred to above. The mixing is conducted at room temperature and at such temperatures the anthracene is relatively insoluble in the solvent and the other hydrocarbon materials in the creosote cake are more highly soluble. In this manner a solution of the solvent and other hydrocarbon materials is formed in which the anthracene is retained as crystals suspended in the solution. The anthracene crystals are then recovered by filtering the solution.

While the pyridine or other selected solvent may be mixed directly with the creosote cake or slurry, it is preferred that the dissolving of the other hydrocarbons by the solvent be effected in a plurality of stages. The introduction of the solvent directly into the creosote cake or slurry would require an excessive quantity of solvent, and, since anthracene is slightly soluble in the selected solvents at room temperatures, the amount recovered would be thereby reduced. To avoid this condition, the dissolving of the hydrocarbons to be removed from the cake is accomplished, in accordance with the preferred practice of the invention, in a plurality of stages through which the anthracene and the solvent respectively move in opposite directions or have a countercurrent flow. At each of the stages, a residue of material containing the anthracene to be recovered is intimately mixed with a solvent and the mixture is then filtered to obtain a new residue in which the anthracene is more highly concentrated and a solution which are respectively transferred in opposite directions with the new residue going to a succeeding stage and the solution going to a preceding stage. In a manner to be described, the solvent is introduced in the final stage of the apparatus where it is mixed with anthracene in substantially pure form. While an upgrading of the anthracene takes place in the final stage due to some of the hydrocarbons to be removed entering into solution therewith, the solvent is substantially saturated with anthracene in this stage so that it is not effective to remove further material amounts of anthracene as it moves through the preceding stages. The anthracene is recovered at each of the stages by a filtering operation and the solution or filtrate separated therefrom is transferred to a preceding stage where it is used as a solvent for the recovered anthracene containing residue transferred to such stage. In this manner the solvent carries with it progressively increasing quantities of the hydrocarbons to be separated from the anthracene as it moves to the initial stage where the creosote cake or slurry is introduced in crude form, the creosote oils and other lower boiling point hydrocarbons being removed in the initial stage or stages, the carbazoles and phenanthrene being removed in the intermediate stages, and the solvent being saturated with phenanthrene in the final stage. While the materials removed by the solvent follow a pattern as the anthracene containing residue moves through successive stages, it will be understood that any selected material to be removed is not eliminated entirely in any given stage and that its removal is progressive as the recovered material moves through succeeding stages.

The accompanying drawings shown an apparatus particularly adapted to the practice of the process of this invention and which forms the subject matter of an application for Letters Patent, Serial No. 430,846, filed May 19, 1954, in the names of William A. Swaney and Frank F. Felkner. In this showing:

Figure 1 is a diagrammatic illustration of an apparatus particularly adapted for the purpose of practicing the process of this invention and which shows the flow of materials therethrough;

Figure 2 is a diagrammatic illustration of an apparatus used at each of the filtering stages in Figure 1 for collecting the solution formed at such stages;

Figure 5 is an end elevational view of a valve ring used in each of the filtering stages;

Figure 6 is a sectional view showing an assembly of the valve ring and mounting rings therefor; and Figure 7 is an end elevational view of a mounting collar used in the assembly of Figure 6.

Figure 3:
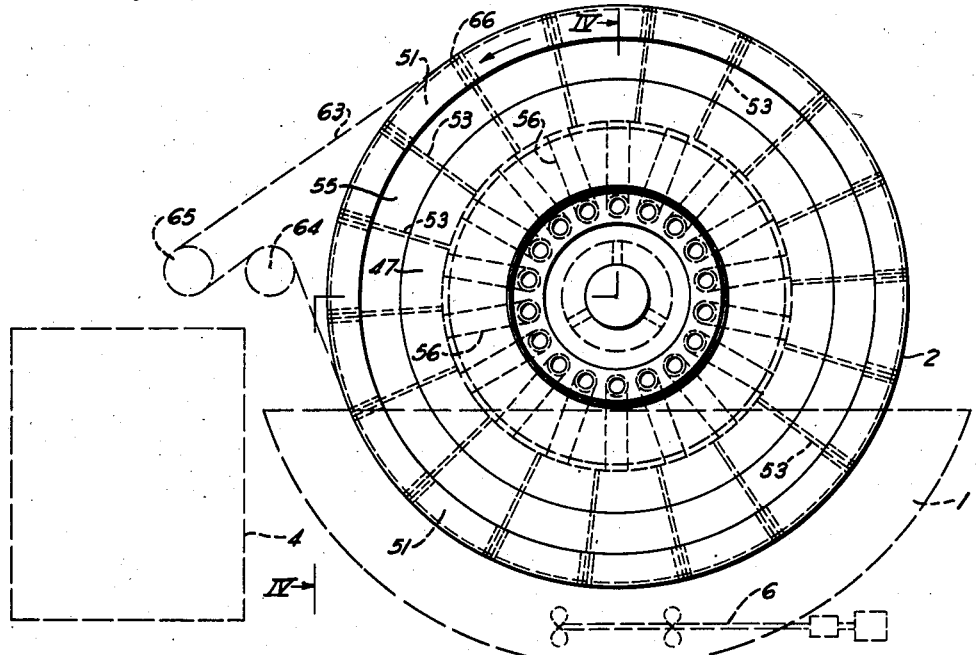
Figure 3 is an end view of one of the rotary filtering units used in the apparatus of Figure 1.

Figure 1 of the drawings shows the apparatus as being comprised of six filtering stages respectively designated by the letters $a$ through $f$ inclusive. Each of the filtering stages has a rotating filter which is constructed in a manner to be described and which is effective to separate a cake of recovered material from a mixture therewith of a solution of soluble substances. At each of the stages, a portion of the soluble substances is removed from the material to be recovered so that the percentage of recovered material in the cake or residue produced at each stage is progressively increased as the material moves through the successive stages from left to right as viewed in Figure 1. While the apparatus is shown as being comprised of six stages, it will be understood that a greater or lesser number of stages may be employed. Generally stated, increasing the number of filtering stages will result in a final product of higher purity while decreasing the number of stages will result in a final product of lesser purity.

At each of the stages, there is provided an upwardly opening slurry pan 1 through which a filter unit 2 is rotated. A slurry is fed to each of the pans 1 through overflow pipes 3 from mixing tanks 4 in which a cake containing the material to be recovered and the soluble substances to be removed is intimately mixed with a solvent in a manner to be described. Each of the mixing tanks 4 has a mixing unit 5 for agitating the cake and solvent supplied thereto to insure intimate mixture of the solvent with the soluble substances in the cake. The slurry pans 1 are provided with agitators 6 (see Figure 3) for agitating the slurry therein to continue the mixing of the solvent with the soluble substances.

Each filter unit 2 is provided with an evacuating unit 7 for withdrawing a solution of soluble substances from the slurry in the pan 1 through which it rotates in such manner that a cake of recovered material is collected on its external surface. The cake of recovered material collected at each stage is removed and fed to the mixing tank for a subsequent stage in a manner to be described. The cake delivered to the tank $4g$ by the final stage $f$ contains the recovered material in purified form and is not mixed with a solvent but is removed from the apparatus by a positive displacement pump 10 or other suitable discharge mechanism. The mixing tanks 4 for each of the stages following the initial stage $a$ receive the cake collected by the filtering unit 2 at the preceding stage, and the mixing tank $4a$ for the initial stage $a$ has the crude creosote cake or slurry delivered thereto by a supply pump 11 connected in a supply conduit 12.

The pyridine or other selected solvent is delivered to the mixing tank $4f$ for the final stage by a supply conduit 13 through which it is fed at a uniform and controlled rate related to the quantity of crude cake being supplied to the initial stage in a manner to be described. The solution withdrawn by the evacuating unit 7 from the final stage $f$, is delivered through discharge conduit 14 to the mixing tank $4e$ for the preceding stage $e$ where it acts as a solvent for the cake recovered at the preceding stage $e$. In like manner, the solution withdrawn by the evacuating unit 7 at each of the remaining stages, excepting the initial stage $a$, is delivered to the mixing tank for a preceding stage and constitutes the solvent for the cake or slurry fed to such stage. The solution withdrawn by the evacuating unit 7 at the initial stage $a$ contains all of the soluble substances removed in the stages $a$ through $f$ and is discharged from the apparatus through a discharge conduit 15. In this manner, the solvent delivered through the supply line 13 is moved successively through the various stages of the apparatus from right to left as viewed in Figure 1 and carries with it progressively increasing amounts of soluble substances.

From the foregoing, it will be apparent that the solvent and the anthracene respectively move through the apparatus in opposite directions, and that the solution formed at each of the stages subsequent to the initial stage $a$ is used as a solvent in the intimately mixed material delivered to the preceding stage. In this manner, a portion of the soluble substances originally contained in the creosote cake enters into solution with the solvent at each of the stages for subsequent movement with the solvent to the discharge conduit 15, and the anthracene is increasingly concentrated or refined as it moves through the successive stages $a$ through $f$ where it is finally removed by the discharge pump 10.

Each of the evacuating units 7 is connected with a filtering unit 2 through a conduit 16 and a valve ring 17, the solution collected in each filtering unit 2 being withdrawn through a valve ring 17 and conduit 16 in a manner to be described. The various evacuating units 7 are respectively connected through a conduit 18 to the inlet or low pressure side of a vacuum pump 19 which has its outlet or high pressure side connected to a conduit system 20 which has a return connection to the interior of an enclosure 21. The enclosure 21 is an hermetic housing for the apparatus through which an atmosphere is continuously recirculated by the pump 19. A condenser 22 and trap 23 are mounted in the conduit system 20 for condensing and removing solvent from the atmosphere being circulated by the pump 19. A pump 24 withdraws the condensed solvent from the trap 23 and returns it through a conduit 25 to the solvent supply conduit 13. A branch conduit 26 is connected with the outlet of the pump 24 for supplying condensed solvent to a vacuum seal (not shown) on the pump 19. The atmosphere circulated through the return system 20 and the hermetic enclosure 21 may be air or a gas which is particularly adapted for use with the solvent supplied through the conduit 13. The return conduit system 20 is of course connected with the conduit 16 through the interior of the enclosure 21 by the filtering units 2 so that the same atmosphere is continuously recirculated and contamination of the surrounding air is effectively prevented.

The atmosphere and solution withdrawn through the conduits 16 must be separated for delivery of the atmosphere to the conduit 18 and for delivery of the solution to the conduits 14, and, for this purpose, the units 7 are constructed as shown in Figure 2. The units 7 are comprised of elements which are conventional and which have been accordingly illustrated diagrammatically in the showing of Figure 2. Each of the units comprises a pair of collector tanks 27a and 27b which are alternately rendered effective through control valves and conduits to provide evacuating connections between the conduits 16 and conduit 18. For this purpose, the conduit 18 has a pair of vacuum manifolds 18a and 18b respectively having connecting conduits 29a and 29b providing evacuating connections to the interiors of the a and b series of tanks 27 through filters 30 in the tops theereof. The filters 30 are made of any suitable material, such as steel wool, effective to separate liquid from the atmosphere being evacuated from the tanks 27. The manifolds 18a and 18b are provided with solenoid actuated shut-off valves 31a and 31b which are alternately operated so that only one of the a and b series of tanks is evacuated at any given time. The evacuating connections of the conduits 16 are completed from the tanks 27 through conduits 32a and 32b which respectively have their terminal ends opening into the tanks 27 at a level below the filters 30 and are provided with alternately operated solenoid actuated shut-off valves 33a and 33b. The collector tanks are further provided with solenoid actuated air admission valves 34a and 34b which are alternately actuated to admit air to the tanks to effect a discharge of the solution collected therein through conduits 35a and 35b to a discharge tank 36, the conduits 35a and 35b respectively having alternately operated shut-off valves 37a and 37b therein.

The solution collected in each tank 36 is discharged by a pump 38 through a discharge conduit 14, or in the case of the unit 7 at the initial stage a through the discharge conduit 15. The rate of discharge by the pump 38 is regulated by a motor operated control valve 39. The valve 39 is a conventional regulating device having coils 40 and 41 for effecting opening or closing movement thereof. Upon energization of one of the coils 40 or 41, the valve 39 will be slowly moved in opening or closing directions. Energization of the coils 40 and 41 is effected by control devices 42 and 43 positioned at different levels in the tank 36 which respectively include a normally open switch (not shown) which closes in response to changing level of the liquid in the tank 36 and energizes one of the coils 40 or 41 to regulate the setting of the control valve 39. When the level of the liquid in the tank 36 rises to the upper control device 42, its switch (not shown) closes and energizes the coil 40 to effect a slow opening movement of the valve 39 and render the pump 38 operative to discharge fluid at a greater rate. Opening movement of the valve 39 continues until the level of fluid in the tank 36 falls below the control device 42 which then operates by a closing of its control switch (not shown) to deenergize the coil 40 and discontinue opening movement of the regulating valve 39. If the solution is being withdrawn too rapidly from the tank 36, its level will fall below the control device 43 and the switch (not shown) therein will close to energize the coil 41 to effect a closing movement of the control valve 39 and reduce the rate of discharge from the tank 43. The control devices 42 and 43 operate to effect slow adjustments of the regulating valve 39 in such manner that the solution is withdrawn from the tank 36 at a rate which maintains the level of fluid therein between the control devices 42 and 43. The vertical spacing of the control devices 42 and 43 is adjusted to the quantity of fluid delivered thereto periodically from the collector tanks 27a and 27b.

A timed actuator (not shown) is provided for alternately operating at timed intervals the a and b series of control valves referred to above in such manner that one of the a or b series of collector tanks 27 is being filled with solution withdrawn from the filtering units while the other is being discharged into the discharge tanks 36. Assuming that the filling period for the a series of collector tanks 27 has ended, the valves 31a and 33a are closed to interrupt the evacuating connections through the tanks 27a, and the valves 34a and 37a are opened to admit air to the interiors of the tanks 27a and to open the discharge conduits 35a so that their contents will be discharged into the tanks 36. At the same time, the valves 31b and 33b are opened and the valves 34b and 37b are closed to establish an evacuating connection to the b series of tanks 37 which begin to collect the solution withdrawn from the filtering units. In like manner, and after a subsequent period of time, the control valves are again actuated to empty the b series of collector tanks 27 and to fill the a series thereof. During these periodic operations of the tanks 27a and 27b, the discharge of the collected solution from the tanks 36 into the conduits 14 and 15 under the control of the regulating valves 39 is maintained at a uniform rate.

Referring again to Figure 1, each filtering unit 2 is mounted on a common drive shaft 44 rotatably supported in bearings 45. The shaft 44 is provided with driving mechanism (not shown) for rotating it and the filter units mounted thereon at speeds varying from about ¼ R. P. M. to about 2 R. P. M.

Figure 4:
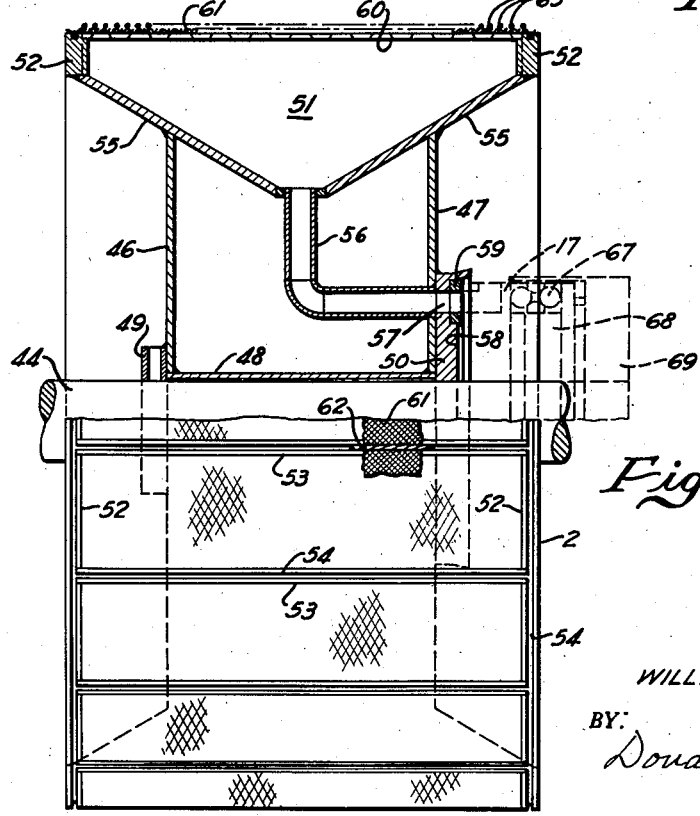
Figure 4 is a side elevation and vertical sectional view taken along the line IV—IV of Figure 3.

Except for the areas of the filtering elements and their respective mesh sizes which are varied at the different stages in a manner and for a purpose to be described, the units 2 are constructed as shown in Figures 3 through 4. Each of the units comprises a pair of annular and axially spaced end plates 46 and 47 which have their inner edges secured to the ends of a cylinder 48. Retaining rings 49 and 50 welded to the outer surfaces of the plates 46 and 47 mount the unit on the drive shaft 44 for rotation therewith. A plurality of circumferentially spaced filtering compartments 51 are arranged about the peripheries of the plates 46 and 47. Each of the compartments is defined by end rings 52 and transversely extending compartment plates 53. The outer edges of the rings 52 and plates 53 have filter cloth mounting grooves 54, and their inner edges are welded to angularly converging plates 55 which in turn are welded to the outer edges of the end plates 46 and 47. At the apex of the converging plates 55, each compartment 51 has a connection with a discharge conduit 56 which is connected with aligned ports 57 in the end plate 47 and mounting ring 50 to provide an exhaust connection through the valve ring 17 in a manner to be described. The valve ring 17 has an annular end face 58 which has sliding engagement with the outer surface of mounting ring 50, a gasket 59 of sealing material being mounted by the ring 50 and having ports therein aligned with the exhaust ports 57 to provide a fluid seal between the mounting ring 50 and valve ring 17.

Each compartment 51 has an outwardly facing opening which is provided with an expanded metal supporting plate 60 having its edges secured to the edges of the compartment plates 53 and the end rings 52 to provide a support for a wire mesh cloth 61 which is wrapped about the exterior surface of each filter unit. As shown fragmentarily in Figure 4, the cloth 61 is secured in position by sections of rope 62 which wedge the cloth 61 in the grooves 54. The openings in the cloth 61 and expanded metal supports 60 provide for the flow of fluid into the compartments 51 while excluding the recovered material which is collected on the external surface of the cloth 61. This cake of recovered material is removed from the cloth 61 by a string discharge mechanism of conventional construction which, as shown in Figures 3 and 4, is comprised of axially spaced strings 63 which are wrapped about the external surface of the wire cloth 61 and reeled over pulleys 64 and 65. As the filter rotates in the direction indicated by the arrow in Figure 3, the recovered cake is stripped from the cloth 61 at the point 66 and carried to the pulley 65 where it is delivered to the mixing tank 4 positioned under the pulley 65.

The valve ring 17 which is fixed against rotation in a manner to be described is forced axially to a position with its face engaged with port ring 50 by thrust bearings 67 mounted in a mounting ring 68 which has its movement resiliently biased in an axial direction to the left as viewed in Figure 4 with respect to a set collar 69. As best shown in Figures 6 and 7, the set collar 69 is formed of two parts 70 of semi-circular shape respectively having clamping flanges 71 which are provided with openings for reception of the bolts 72 to clamp the collar on the shaft 44 for rotation therewith, each of the parts 70 having a recess 73 of semi-circular shape in which the shaft 44 is received. The outer periphery of each part 70 has an axially extending flange 74 which forms a cover for the mounting ring 68 which is mounted concentrically therewith. The ring 68 is mounted loosely on the shaft 44 and has its movement biased in an axial direction to the left as viewed in Figure 6 by plungers 75 slidably mounted in openings 76 in the set collar 69, biasing springs 77 being provided in the openings 76 for moving the plungers 75 outwardly with respect thereto. The outer ends of the plungers 75 are received in openings 78 in the mounting ring 68 and provide driving connections for rotating the mounting ring 68 with the set collar 69 in addition to biasing the mounting ring 68 and the valve ring 17 in a direction toward the port ring 50. The thrust bearings 67 are received in an annular space 79 about the periphery of the mounting ring 68 and are effective to transmit the thrust of the plungers 75 to the valve ring 17.

As indicated above, the valve rings 17 are held against rotation with respect to the drive shaft 44. For this purpose, and as shown in Figure 5, each valve ring is provided with an anchoring lug 70 having a pivot pin 81 secured to the end of an anchoring rod 82. The other end of the anchoring rod 82 has an adjustable connection (not shown) to a stationary support (not shown) for holding the valve ring 17 against rotational movement and for adjusting its angular position on the drive shaft 44. As shown in Figures 5 and 6, each valve ring 17 has a circumferentially and axially extending port 83 which opens into the annular end face 58 thereof which has sliding engagement with the outer face of the retaining or port ring 50. Radially extending ports 84 connect the port 83 with a manifold 85 which has a connection at 86 with one of the evacuating conduits 16. Intermediate the ends of the elongated port 64, the ring is provided with a shorter circumferentially and axially extending port 87 which communicates with a conduit 88 through a radially extending port 89. The conduit 88 is connected with a source (not shown) of compressed air for a purpose to be described.

The manner in which the ports 83 are effective to evacuate the compartments 51 and discharge the liquid solution collected therein will be best understood by considering the action which takes place as the compartment 51 shown in dotted lines in Figure 5 rotates in the direction indicated by the arrow. When the aligned ports 57 at the inner end of the conduit 56 move to a position communicating with the end 90 of the port 83, evacuation of the interior of the compartment 51 is started. At this position, the portion of the filter screen 61 covering the outer end of the compartment 51 will move into the slurry in the slurry pan 1 through which the filter is rotating, and evacuation will be completed when the screen is completely submerged. Due to the pressure difference of the pressure acting against the surface of the liquid in the pan 1 and the pressure within the compartment 51, the solution in the slurry is forced through the filtering screen 61 into the compartment 51 leaving a residue containing the anthracene on the outer surface of the screen 61. Flow of solution through the screen 61 will continue at least until the evacuating ports 57 move to the point 91 at which point the compartment 51 moves out of the slurry. As the evacuating ports 57 move beyond the point 91, the solution in the compartment 51 will flow downwardly over the plates 55. As the solution flows downwardly over the plates 55, it moves into the conduit 56 at the inner end of the compartment 51 and is evacuated through the ports 57. Evacuation of the solution from the compartment 51 will have been completed when its evacuating ports 57 move out of engagement with the port 83 at the point 92. Venting of the compartment 51 begins at the point 92 and is completed when the ports 57 connect with the air supply port 87. Admission of compressed air through the port 87 pressurizes the interior of the compartment 51 and loosens the material collected on the screen 61 to facilitate its removal by the discharge strings 63. Admission of air through the port 87 is additionally effective for cleaning the filter openings in the screen 61. Since the same operating cycle is continuously repeated by all of the compartments 51, it will be apparent that each rotating filter unit 2 is effective to continuously separate and withdraw a liquid solution from the slurry pan 1 through which it rotates and to collect and deliver a cake containing the recovered anthracene to the mixing tank 4 for a subsequent stage.

It will be recalled that the filter units are identical in construction except for the mesh sizes and effective filter areas of the screens 61. The sizes of the foramina in the filter screens 61 and their effective filter areas are made smaller at successive stages in accordance with the quantity and size of the particles of anthracene being recovered. If the same size of foramina were used in each of the filtering screens 61, anthracene crystals collected on the screen at the initial stage $a$ might pass through the filtering screens at subsequent stages by the section of the solvent in removing soluble substances adhering thereto and in reducing the effective particle size. Moreover, the bulk of recovered cake is reduced at each stage by the dissolving action of the solvent, and would be insufficient to provide an effective covering layer of cake on the surface of the filter screens 61 at later stages if all of the filter elements were of the same size and had the same effective filtering area. To prevent loss of the anthracene crystals by movement through the filtering screens at successive stages, at least selected ones of successive filtering screens 61 have a mesh of foramina size which is made progressively smaller. In order to assure the formation of an adequate covering of the character or residue on the external surfaces of the filtering elements 61 at successive stages and thereby proper operation of the filtering units, at least selected ones of successive filtering stages have progressively decreasing filtering areas.

Referring to Figure 1, attention is directed to the fact that the successive filtering units 2 at the stages $a$ through $f$ have an axial length which is progressively decreased. Decreasing the axial length of the filtering units 2 in this manner results in a progressive reduction of the effective filtering area at each of the stages. This reduction in effective filtering area at successive stages compensates for the removal of the soluble substances at preceding stages and insures proper filter action by obtaining an adequate covering of cake on the exterior surface of the filtering screens 61 at successive stages. In Figure 1, the mesh size of the filtering elements at the stages $a$ and $b$ is indicated as 100 mesh, 150 mesh at the stages $c$ and $d$, and 200 mesh at the stages $e$ and $f$, this variation in the mesh size of the filtering elements having been found adequate for the recovery of anthracene from a creosote oil cake or slurry using one of the selected solvents. It will of course be understood that the axial depth and thereby the effective filtering areas at successive units 2 as well as the size of the filter foramina will vary with the particle size in the material to be recovered.

The crude creosote cake or slurry is continuously fed to the initial mixing tank 4$a$ at one end of the apparatus and solvent is continuously fed to the final mixing tank 4f at the other end of the apparatus. The materials are fed and all of the operations at the different stages are conducted at room temperature. As the solvent moves through each filter stage to the discharge conduit 15, a portion of the soluble substance originally in the crude slurry introduced at 4a enters into solution with the solvent for movement therewith to the discharge conduit 15, and the quantity of anthracene in the recovered cake is progressively increased at it moves through successive stages to the final collecting tank 4g. As explained above, the preferred solvent for the recovery of anthracene is selected from the group consisting of pyridine, its homologues alpha picoline and beta gamma picoline, and methyl-ethyl ketone since these solvents give a recovery of anthracene of 90% to about 94% purity at the collecting tank 4g. When one of the preferred solvents is used, the solvent is saturated with anthracene in the final stages e and f with some removal of soluble substances being effected at both stages and being more pronounced in the stage e. The heavier aromatic hydrocarbons such as the carbazoles, naphthalene, phenanthrene, and other unclassified high boiling point hydrocarbons are removed from the cake primarily in the stages c and d. Since the anthracene delivered to the final stage f is highly concentrated and has limited solubility in one of the preferred solvents, the solvent is substantially saturated with anthracene in the final stage and is thus not noticeably effective to remove further amounts of anthracene as it moves through the preceding stages. When the solvent containing the higher boiling point hydrocarbons in solution therewith moves through the initial stages a and b it removes the lighter and other lower boiling point hydrocarbons such as the creosote oil together with some of the heavier crystal hydrocarbons.

Attention is particularly directed to the fact that the cakes of recovered material delivered to the stages c and d are comprised essentially of hydrocarbon compositions of crystalline structure including the anthracene to be recovered. In these stages, most of the carbazole, phenanthrene, naphthalene and other unclassified crystal hydrocarbons enter into solution with the pyridine or other selected solvent leaving the anthracene suspended in the solution for recovery by a filtering operation. While the solvent used in the stages c and d is saturated with anthracene and contains some of the other hydrocarbon crystals in solution therewith by reason of its previous use in the final stages e and f, it will be understood that such final stages may be eliminated and pure solvent used in the stages c and d. However, this would result in the loss of some anthracene in the stages c and d and, accordingly, it is preferred that a solvent saturated with anthracene as obtained from the final stages e and f be used to prevent this loss and to thereby obtain a more highly concentrated content of anthracene in the final recovered product.

The solvent used in the removal of the creosote oil and other lower boiling point hydrocarbons in the stages a and b is of course the solution removed from stage c which contains the crystal hydrocarbons removed in stage c and subsequent stages. While any organic solvent such as the higher alcohols or the hexane family of solvents could be used for this purpose in the initial stages, such solvents would complicate the recovery procedure and the use of the solution obtained from the stage c is preferred in the interest of simplicity. Moreover, the use of the solution removed from stage c as a solvent provides an advantage in that it is effective to remove some of the higher boiling point hydrocarbon crystals in the initial stages along with the creosote oils and lower boiling point materials.

In comparison with other recovery procedures such as the proposed procedure referred to above, the process of this invention is effective to recover anthracene from crude cakes in which the anthracene content is considerably lower than the minimum required for other processes.

While no minimum limit of anthracene content has been established for the process of this invention, it has been found effective for crude cakes in which the anthracene content is as low as 8 percent. In general, the anthracene content of the crude cake will be found to effect the purity of the final product. Cakes having higher contents will result in a final recovery of greater purity since there is a relatively smaller amount of other materials to be removed by the solvent. The effect of the anthracene content of the crude cake is shown in the following table.

TABLE I

Counter-current extraction of anthracene from crude anthracene cake, with pyridine as the solvent

[seven stages of contacting]

| Anthracene Content of Crude Cake, percent | Final Purity of Anthracene, percent | Yield of Anthracene, percent |
|---|---|---|
| 23.7 | 87.7 | 82.5 |
| 33.4 | 94.5 | 79.2 |

As indicated above, the number of stages employed affects the purity of the recovered product and also the yield. In general, the anthracene content of the recovered product increases with the number of stages while the yield is reduced somewhat. Table II shows the variation in yield and purity with the number of stages.

TABLE II

Variation in the number of stages: effect on the purity and yield of anthracene extracted from crude anthracene cake by continuous countercurrent extraction, with pyridine as the solvent

| Anthracene Content of Crude Cake, percent | Number of Stages | Final Purity of Anthracene, percent | Yield of Anthracene, percent |
|---|---|---|---|
| 33.4 | 1 | 69.5 | 79.7 |
| 33.4 | 2 | 81.7 | 79.7 |
| 33.4 | 3 | 88.2 | 80.2 |
| 33.4 | 5 | 93.1 | 79.2 |
| 33.4 | 7 | 94.5 | 79.0 |
| 33.4 | 10 | 96.2 | 75.5 |
| 23.7 | 7 | 87.7 | 82.5 |
| 23.7 | 10 | 92.0 | 74.5 |

While there is no limit to the number of stages which may be used, it will be noted that the yield is not noticeably diminished until more than seven stages are employed. From this, it appears that limiting the number of stages to between five and seven will give the most desirable results from the standpoint of both yield and purity.

Laboratory tests have determined that any of the selected solvents pyridine, alpha picoline, beta gamma picoline, and methyl-ethyl ketone may be employed. Table III gives a comparison of the yield and purity obtained when using pyridine and alpha picoline as solvents, and from which it will be noted that both solvents give substantially the same results.

TABLE III

Comparison of pyridine and alpha-picoline as solvents for refining crude anthracene cake

| Solvent | Anthracene in Crude Cake, percent | Final Purity of Anthracene, percent | Yield of Anthracene, percent |
|---|---|---|---|
| Pyridine | 33.4 | 86.6 | 81.5 |
| Alpha-Picoline | 32.7 | 86.5 | 82.5 |

As further indicated above, the solvent is fed continuously to the final stage at a rate which is proportioned to the rate at which the crude cake is fed to the initial stage. Generally stated, increasing the ratio by weight of solvent to crude cake increases the pudity of the recovered product but decreases the yield. Table IV shows the effect of varying the weight ratio using pyridine as the solvent.

TABLE IV

*Variation in the amount of solvent: effect on the purity and yield of anthracene extracted from crude cake containing 33.4 percent anthracene*

| Weight Ratio of Solvent to Crude Cake | Number of Stages | Final Purity of Anthracene, percent | Yield of Anthracene, percent |
|---|---|---|---|
| 0.7 | 5 | 73.0 | 84.7 |
| 1.0 | 5 | 87.5 | 81.7 |
| 1.25 | 5 | 93.1 | 79.2 |

From the above table, it will be apparent that the preferred ratio is between 1.0 and 1.25. The preferred ratio will be found to change with the amount of anthracene in the crude cake. Generally stated, crude cakes having lesser amounts of anthracene therein require less solvent. For a crude cake containing 10–12 percent anthracene, the best ratio for an anthracene recovery of 90 percent or greater was found to be between 0.7 to 1.0 using five stages of extraction.

As will be apparent from Tables II and IV, the purity of the recovered anthracene may be increased by either increasing the quantity of solvent or the number of extracting stages. However, the increase in purity by increasing the number of stages is obtained without increasing the quantity of solvent used and this indicates the desirability of multiple-stage extraction. While the purity of the recovered anthracene for any given number of stages may be approximated in a lesser number of stages by the use of greater quantities of solvent, the result is wasteful of both solvent and anthracene. Accordingly, it will be understood that the use of a greater number of stages using the minimum amount of solvent necessary to provide the desired purity of recovered anthracene represents the preferred practice of the process of this invention. The use of plural extracting stages through which the anthracene and solvent move in reverse directions as explained above contributes to a reduction in the amount of solvent required and thus provides a recovered product of both maximum purity and yield.

While one embodiment of my invention has been shown and described it will be apparent that other adaptations and modifications may be made without departing from the scope of the following claims.

I claim:

1. A continuous process for recovering anthracene from a crude material by filtration in a plurality of rotary vacuum filter stages arranged consecutively in an hermetic enclosure, said material being derived from the creosote run-off produced by the fractional distillation of coke-oven tar and containing other hydrocarbons mixed with the anthracene to be recovered, which comprises continuously feeding a slurry of said crude material to the initial one of said stages, continuously feeding to the final one of said stages a solvent for said other hydrocarbons in which anthracene is relatively insoluble, said solvent being selected from the group consisting of pyridine, alpha picoline, beta gamma picoline, and methylethyl ketone, proportioning the quantities of said crude material and said solvent being fed respectively to said initial and final stages to provide a ratio of from 0.7 to 1.25 parts by weight of solvent to crude material, and moving an anthracene containing portion of said crude material and said solvent respectively in opposite directions and progressively through all of said stages by operations at each stage which include continuously flowing the solvent and the said anthracene containing portion of said crude material together in an integrated manner to form an intimate mixture thereof whereby a portion of said other hydrocarbons enters into solution with the solvent at each stage, continuously circulating an evacuating atmosphere through said enclosure and each of said filters to filter said mixture and recover a cake of said anthracene containing portion and a filtrate of at least a portion of said other hydrocarbons in solution with said solvent, and at each filter separating the filtrate from the evacuating atmosphere, removing the vaporized solvent from the atmosphere evacuated at each filter and then returning such atmosphere to said enclosure for recirculation through the filters, transferring all of the filtrate and cake recovered at each stage in opposite directions to adjoining stages, removing the said solvent and said other hydrocarbons in the filtrate recovered at the initial stage, and removing the said anthracene containing portion of said crude material at the final stage.

2. The anthracene recovery process defined in claim 1 characterized by said feeding being proportioned to provide a ratio of between 1.00 and 1.25 parts by weight of solvent to crude material.

References Cited in the file of this patent

UNITED STATES PATENTS

| 1,199,861 | Barstow et al. | Oct. 3, 1916 |
| 1,831,059 | Daniels | Nov. 10, 1931 |
| 1,922,730 | Gore et al. | Aug. 15, 1933 |